United States Patent
Larsson et al.

(10) Patent No.: US 6,757,296 B1
(45) Date of Patent: Jun. 29, 2004

(54) METHOD AND APPARATUS FOR PROCESSING ASYNCHRONOUS DATA

(75) Inventors: Gunnar Larsson, Tumba (SE); Lars-Göran Petersén, Tumba (SE); Stefan Pudas, Sundbyberg (SE); Patrik Wiss, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 716 days.

(21) Appl. No.: 09/706,249

(22) Filed: Nov. 3, 2000

(51) Int. Cl.[7] ................................................. H04J 3/16
(52) U.S. Cl. ................ 370/468; 370/329; 370/347; 370/437; 370/442; 455/450; 455/464; 455/509
(58) Field of Search ............................... 370/442, 465, 370/468, 477, 493, 498, 436, 437, 508, 314, 535, 329, 235, 238, 321, 326, 337, 347; 455/450, 452.1, 464, 509

(56) References Cited

U.S. PATENT DOCUMENTS 5,497,373 A  *  3/1996  Hulen et al. ................ 370/259
5,585,850 A  * 12/1996  Schwaller ............... 375/240.01
5,719,867 A  *  2/1998  Borazjani .................... 370/436
6,421,356 B2 *  7/2002  Carter et al. ................ 370/468

OTHER PUBLICATIONS

Zhang, L et al: "Scheduling Algorithms for Parallel Real-Time systems"; IEEE Pacific Rim Conf. On Communications, Computes and Signal Processing, pp. 968–971.
Sohn, A et al: "Effects of multithreading on data and workload distribution for distributed–memory multiprocessors" Proceedings of IPPS '96, pp. 116–122.

* cited by examiner

*Primary Examiner*—Dang Ton
*Assistant Examiner*—Tri H. Phan

(57) ABSTRACT

Asynchronous data samples are received from a plurality of data channels for distribution onto a plurality of data processors each having a plurality of processing-slots. The identity of a channel from which a sample is received is determined using a channel ID associated with the sample. A time-stamp is assigned to at least one sample from each respective channel. Finally, at least one time-stamped sample is assigned to a processing-slot such that the separation between the time-stamp and a nearest time-stamp of at least one sample assigned to at least one other processing-slot of each respective processor is maximized.

46 Claims, 6 Drawing Sheets

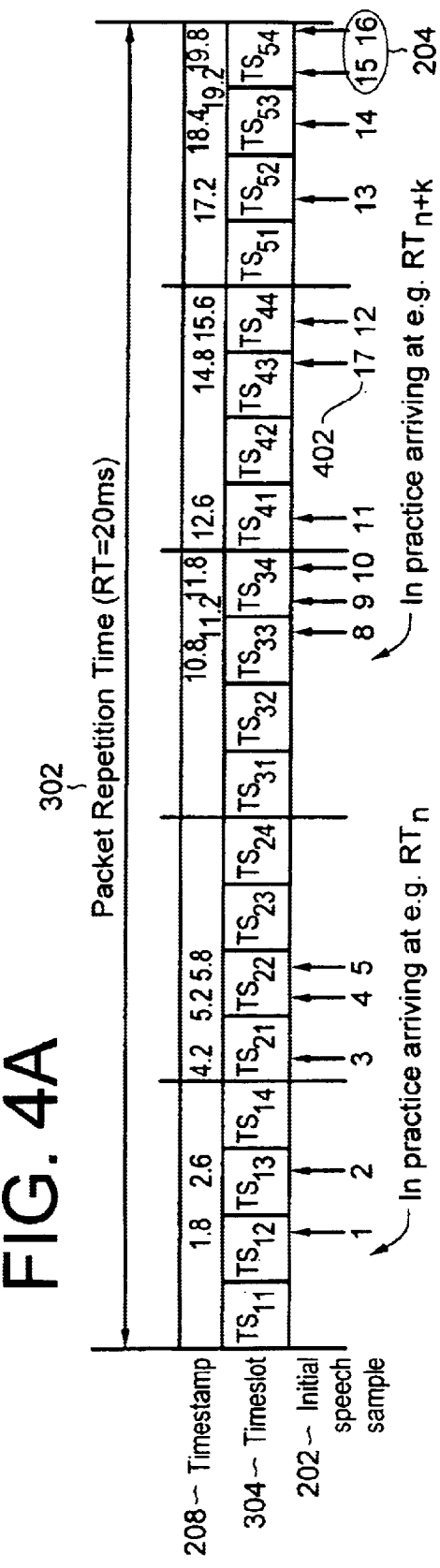

| Speech sample Id | Timestamp | Processor No. | Arrival Time Difference |
|---|---|---|---|
| 1 | 1.8 | 1 | |
| 2 | 2.6 | 2 | |
| 3 | 4.4 | 3 | |
| 4 | 5.2 | 4 | |
| 5 | 5.8 | 1 | |
| 8 | 10.8 | 4 | 4.0 |
| 9 | 11.2 | 1 | 3.6 |
| 10 | 11.8 | 2 | 3.0 |
| 11 | 12.6 | 3 | 2.2 |
| 17 | 14.8 | NEW: 2 | — |
| 12 | 15.6 | 4 | 0.8 |
| 13 | 17.2 | 1 | 2.4 |
| 14 | 18.4 | 2 | 3.6 |
| 15 | 19.2 | 3 | 4.4 |
| 16 | 19.8 | 4 | |

FIG. 5

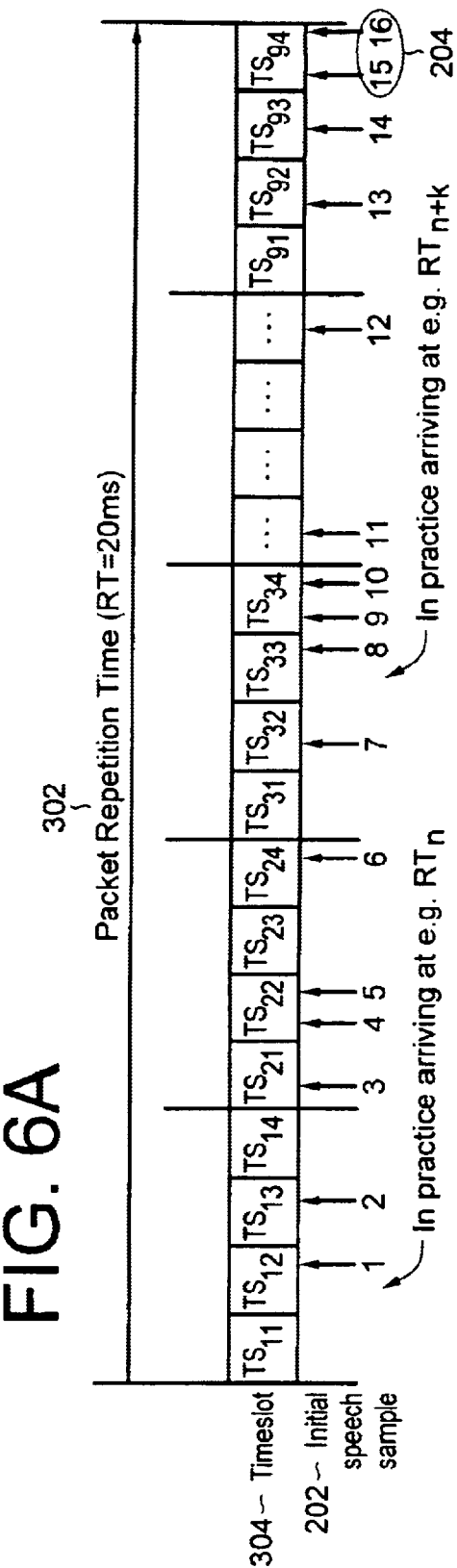

and apparatus for distributing asynchronous data from different data channels onto different processors to maximize data processing capability and to minimize processing delay and data loss.

METHOD AND APPARATUS FOR PROCESSING ASYNCHRONOUS DATA

BACKGROUND

This invention relates to a method and apparatus for processing asynchronous data. In particular, this invention relates to a method and apparatus for distributing asynchronous data from different data channels onto different processors to maximize data processing capability and to minimize processing delay and data loss.

Conventional telecommunication systems use circuit-switched domains to transfer voice data over a communication network. In these circuit-switched systems, it is a straightforward process to distribute the data of various speech calls onto different speech processors in the telecommunication system.

Today, however, a paradigm shift is occurring in the telecommunication industry resulting in an increased use of asynchronous switch domains to carry voice data over networks. This shift has lead to a need for switches that are capable of processing this asynchronous voice traffic efficiently. In particular, these switches must be designed so as to minimize speech call delay and to avoid injecting excessive jitter onto the processed output signals. Another important consideration in designing these asynchronous switches is that, in many cases, the ultimate destination of the switched asynchronous data is a circuit-switched domain, requiring highly synchronized data to operate efficiently. These goals must be balanced against the need to utilize the network processing resources in the most efficient manner possible.

Minimizing the amount of speech call delay is particularly important in today's mobile telecommunication systems, as any call delay introduced into the voice channel will degrade the quality of the voice transmission. Voice quality degradation results primarily from delayed speech data that disturbs the time-relation of the various speech samples comprising a voice transmission. This delay may occur because of environment conditions, processing delay, or as a result of activated error concealment procedures. These concealment procedures are activated in the speech processors of the telecommunication system whenever there exist excessively delayed (and thus unusable) speech data in the voice transmission. The procedures operate to silently discard speech data that is determined to exceed a predetermined amount of call delay.

Additional call delay may result when asynchronous speech samples from multiple speech channels are routed to a single processing unit for speech processing. The speech samples often must be queued before being processed because of limited resources available at the single processing unit. This queuing introduces call delay into the speech channels that can degrade the voice quality. The task of minimizing queue-induced call delay may be further complicated when using multi-processor switching nodes to route the asynchronous voice traffic throughout the telecommunication system. The asynchronous nature of the speech samples makes it difficult to distribute the samples in the multi-processor unit so as to minimize the amount of queuing, while maximizing the processing unit's efficiency.

The use of code/decode (CODEC) algorithms to process speech data is pervasive in today's speech processors. These CODECs produce packets of compressed speech data that are sent over a speech channel at constant time intervals. Although the speech samples processed using a CODEC remain substantially asynchronous in nature, the CODEC has the effect of introducing some synchronicity into the transmitted data. For example, speech samples dispatched from the CODEC will arrive at their destination within a reasonably fixed time-interval. This interval is commonly referred to as the packet repetition time. If the amount of jitter introduced into the voice channels can be kept to a reasonably low level, then the speech samples dispatched by the CODEC will arrive at their destinations relative to the packet repetition time of the channel. This knowledge of the packet repetition time for the various voice channels may be exploited to design a more efficient method of distributing speech data onto the different processors of a multi-processor speech processing unit.

In addition to the use of CODECs, other data processing functions have the effect of either introducing some degree of synchronicity into the processed asynchronous data or at least preserving the synchronicity introduced by other data processing functions present in the system. Examples of these functions include, e.g., echo cancellation, tone sending and receiving, Dual-Tone-Multi-Frequency (DTMF) sending and receiving, video coding and decoding, ATM, IP, Frame Relay, FDMA, TDMA, CDMA, and the like. Again, if the amount of jitter introduced in processing the data can be kept to a reasonably low level, then the synchronicity introduced into the data as a result of the processing can be exploited to provide a more efficient method of distributing data onto the different processors of a multi-processor data processing unit.

Asynchronous switch domains may be implemented in a variety of telecommunication systems. One type of system in which asynchronous domains may be used is a Public Land Mobile Network (PLMN). The nature of the air interface in a PLMN is such that packets may occasionally be lost due to network environment conditions. The amount of packet loss that may occur in an asynchronous switch based network can be higher than the amount of packet loss that occurs in a PLMN using Time Division Multiplexed/Statistical Time Multiplexed (TDM/STM) based switching. However, it is observed that speech is relatively insensitive to packet loss as compared to the effect of packet loss on pure data transmissions.

Knowledge of the robustness of speech with respect to packet loss would make it possible in a PLMN having asynchronous switch domains to allow a certain amount of loss to occur in each voice channel without affecting voice quality. There are limits to the amount of packet loss that can be sustained before voice quality is degraded, however, thus the amount of packet loss per channel should be kept below some determined level. The flexibility to selectively discard speech packets may be exploited to design a more efficient method of processing speech data in a multi-processor unit by allowing the unit to resolve resource conflicts through the discarding of packets in heavily loaded processors.

Therefore, in a telecommunication system having asynchronous switch domains and a plurality of processing units for processing data samples, there is a need for a method and apparatus for distributing the data samples among the plurality of processing units to maximize processing capability and minimize processing delay and data loss in the system.

SUMMARY

It is therefore an object of the invention to provide a method and apparatus for distributing asynchronous data samples among a plurality of data processors operating in a telecommunication system using information related to an expected arrival time of the data samples so as to minimize the amount of data queuing required at each of the processors. It is yet another object of the invention that the data processors selectively discard data samples to maximize the overall processing capability of the data processing resources available in the telecommunication system.

According to the invention, these and other objects are met by a method and apparatus for processing asynchronous data. Asynchronous data samples are received from a plurality of data channels for distribution onto a plurality of data processors each having a plurality of processing-slots. The identity of a channel from which a sample is received is determined using a channel ID associated with the sample. A time-stamp is assigned to at least one sample from each respective channel. Finally, at least one time-stamped sample is assigned to a processing-slot such that the separation between the time-stamp and a nearest time-stamp of at least one sample assigned to at least one other processing-slot of each respective processor is maximized.

According to an exemplary embodiment, an un-stamped data sample is assigned to a same processing-slot assigned to at least one other sample received from the respective channel the un-stamped sample is received from. An entry in a time distribution table is made for each assigned sample, the entry including the channel ID of the assigned sample, the time-stamp of the assigned sample, and a processing-slot ID corresponding to the processing-slot the sample is assigned to. The time distribution table is searched for a matching entry having the same channel ID as the un-stamped data sample. An un-stamped data sample is assigned to the processing-slot corresponding to the processing-slot ID of the matching entry. When the processing of data samples for a channel is complete, the entry in the time distribution table having the corresponding channel ID is removed.

According to another exemplary embodiment, a processing-slot distribution matrix is created having a number of matrix entries equal to the number of processing slots, wherein a column of the matrix corresponds to a respective processor and a row of the matrix corresponds to a respective processing-slot. The channel ID and time-stamp for each assigned sample is stored in a matrix entry corresponding to the processor and processing-slot to which each sample is assigned. The maximum separation between the time-stamp of a sample to be assigned a processing-slot and the nearest time-stamp is determined by comparing time-stamp entries in the processing slot distribution matrix. The channel ID and time-stamp method are removed from the distribution matrix for an assigned sample when the processing of data samples for the channel corresponding to the channel ID of the assigned sample is complete.

BRIEF DESCRIPTION OF THE DRAWINGS

The features and objects of Applicant's invention will be understood by reading this description in conjunction with the drawings, in which:

FIGS. 4A, 4B, and 4C illustrate the state of speech data in the distribution mechanism after allocation of a new speech sample according to the first exemplary embodiment;

FIG. 5 illustrates computation of an arrival time difference according to the first exemplary embodiment; and FIGS. 6A, 6B, and 6C illustrate the state of speech data in the distribution mechanism after allocation of a new speech sample according to a second exemplary embodiment.

DETAILED DESCRIPTION

Figure 1:
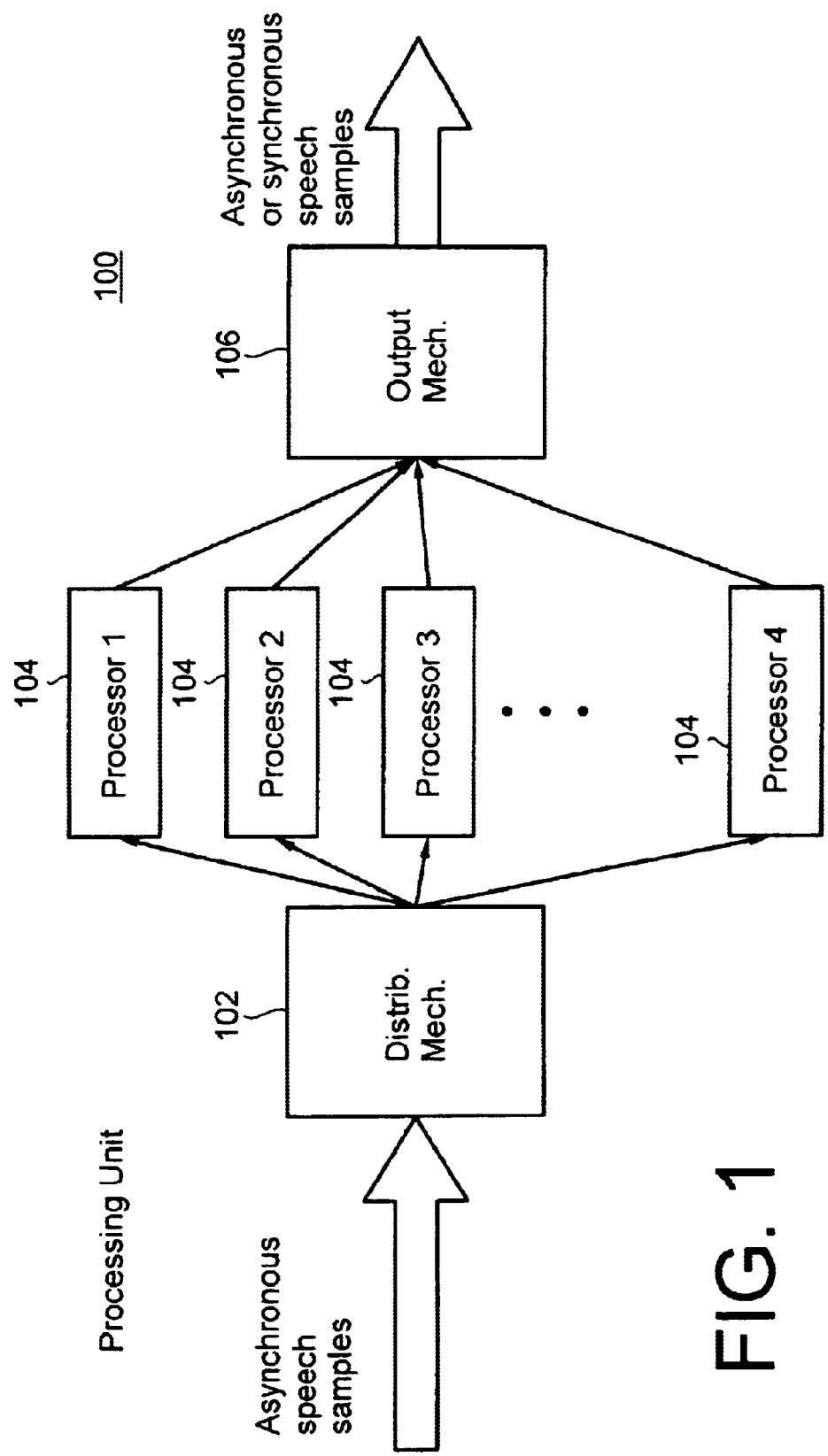
FIG. 1 illustrates a speech processing unit in which the invention may be implemented.

It should be understood that the following description, while indicating preferred embodiments of the invention, is given by way of illustration only since various changes and modifications within the scope of the invention will become apparent to those skilled in the art.

In particular, while the invention is described in the context of distributing asynchronous speech samples onto a plurality of speech processors, the skilled artisan will appreciate that the invention may be used to efficiently distribute any type of asynchronous data onto a plurality of general purpose processors when the asynchronous data exhibits characteristics similar to the speech data described in the following exemplary embodiments.

According to exemplary embodiments, a method and apparatus are provided for distributing asynchronous voice data from different speech channels onto different processors to maximize speech processing capability and to minimize call delay and data loss. This may be understood by referring to FIG. 1, in which a processing unit 10 0 is shown for processing asynchronous speech samples. The processing unit 100 comprises a distribution mechanism 102, coupled to a plurality of processors 104. The processors 104 may be any type of processor suitable for processing speech data, e.g., Digital Signal Processors (DSPs). The distribution mechanism 102 (described below) distributes the speech samples onto the processors 104 so as to minimize the amount of queuing delay and maximize the overall processing capability of the unit. After being processed, the speech samples are fed from the different processors 104 to an output mechanism 106 that multiplexes the processor outputs and converts the processed speech samples into any number of formats, either asynchronous or synchronous.

The processing unit shown in FIG. 1 may be implemented as a single device board in a telecommunication switch, e.g., the Ericsson Media Stream Board (MSB) that is described in the System Description for Cello based MGW for UMTS R2, LMF/T/G-00:002 Uen, Rev. A, and which is incorporated by reference herein. It will be understood that the invention may be implemented in telecommunication systems having a plurality of single-processor speech processing units that are each capable of handling the speech data from several speech channels, each processor being coupled to a separate distribution and output mechanism. The invention may also be implemented using a plurality of multiple-processor speech processing units coupled to a common distribution and output mechanism, where each processor within the multi-processor speech processing units is capable of processing the speech data from several speech channels. These distinctions do not substantially affect implementation of Applicant's invention.

Figure 2:
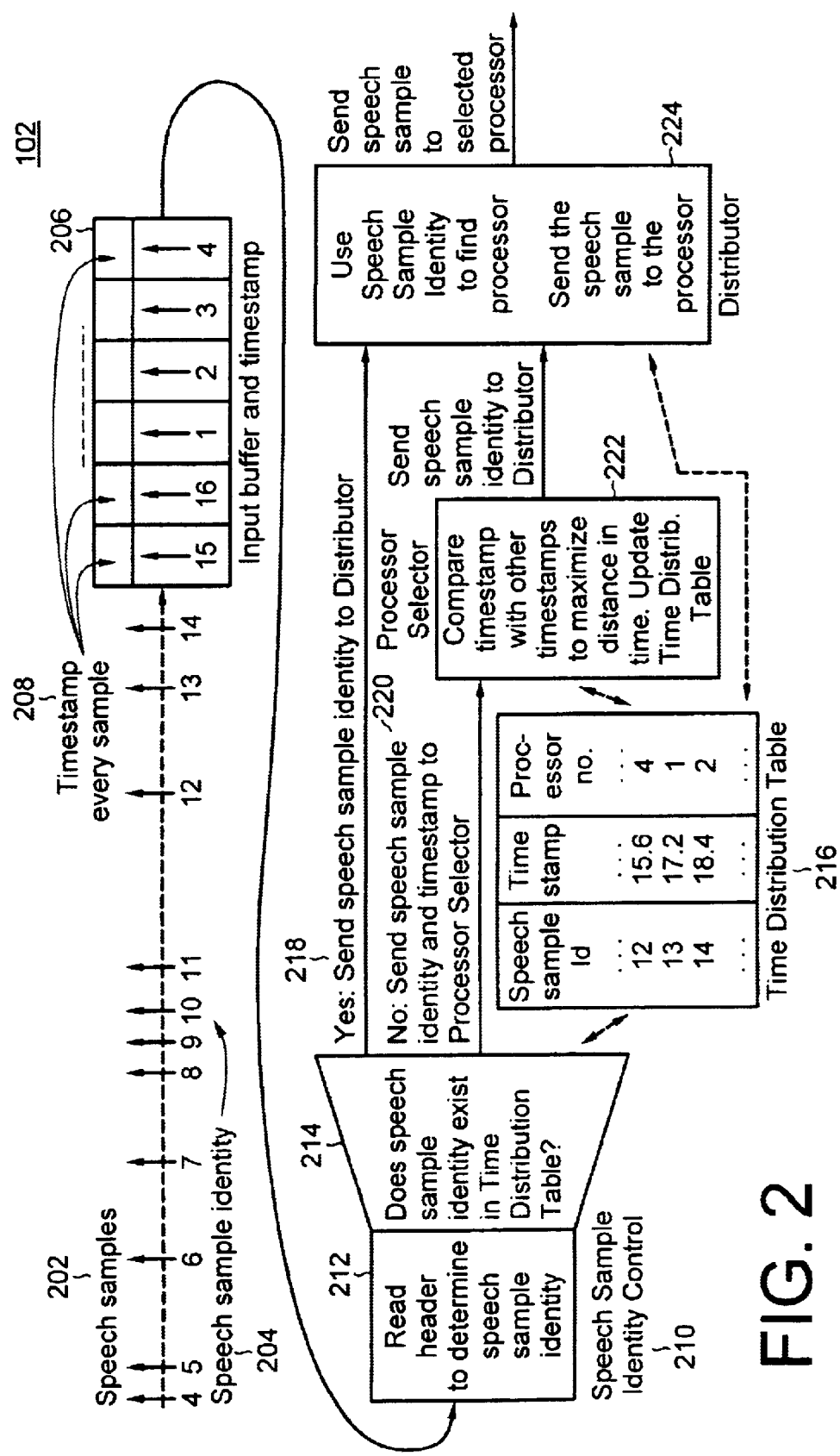
FIG. 2 illustrates the flow of speech data in a distribution mechanism in which the invention may be implemented.

An exemplary embodiment of a distribution mechanism in which the invention may be implemented is shown in FIG. 2. Speech samples 202 from various speech channels arrive at the distribution mechanism 102 each having a speech sample channel identity 204 (shown for illustration purposes as integer values) corresponding to the speech channel (or call) the sample belongs to. Upon arrival, the samples are placed in an input buffer 206 and assigned a time-stamp 208. According to an exemplary embodiment, the time-stamp 208 assigned to each of the speech samples represents a relative time within the packet repetition time for the speech channels. In another exemplary embodiment, only the first speech sample of a respective speech channel is assigned a time-stamp. In yet another exemplary embodiment, a time-stamp representing an average arrival time for the speech samples of a respective channel is assigned to the samples.

Next, the buffered and time-stamped speech samples are processed by a speech sample identity control unit 210. This unit reads 212 a header associated with the speech sample to determine the sample's channel ID 204, then determines 214 if the sample belongs to a speech channel that has already been assigned a processor 104 in the processing unit 100. To make this determination, the identity control unit 210 searches a time distribution table 216 for an entry corresponding to the speech sample's channel ID 204. The time distribution table 216 contains entries for those speech samples that have been assigned to a processor 104 by the distribution mechanism 102. Entries in the distribution table 216 contain information pertaining to the channel ID 204, time-stamp 208, and processor number that the sample (and thus the channel) has been assigned to.

If an entry corresponding the channel ID 204 exists in the distribution table 216, then the speech sample is forwarded 218 to a distributor 224 that distributes the speech sample onto a speech processor 104 already assigned to process speech samples from the identified speech channel. The distributor 224 uses the channel ID 204 and time distribution table 216 to route the speech sample to the appropriate processor 104. If no entry corresponding to the channel ID 104 can be found in the time distribution table 216, the channel ID and time-stamp 208 for the speech sample are forwarded to the processor selector unit 222.

The processor selector unit 222 assigns speech samples to the processor 104 such that consecutively arriving speech samples belonging to different speech channels are allocated to different processors. This assignment method maximizes the processing time available for each speech sample, which in turn leads to shorter processor queues and increased speech processing performance. As discussed above, the speech samples of a respective channel that are processed by a CODEC or some other data processing function tend to arrive at their destinations relative to the packet repetition time of the channel. Accordingly, speech samples belonging to a respective speech channel can be expected to arrive at their destination within a reasonably fixed respective time-interval. Furthermore, the speech samples belonging to other speech channels in the system will tend arrive at their destination within fixed time-intervals that are time shifted by the channels' respective packet repetition times.

Based on this knowledge of the behavior of the processed asynchronous speech samples, the processor selector unit 222 uses the speech sample identity 204 and the time-stamp 208 to assign the sample to a processor 104, such that the average arrival time between speech samples belonging to different speech channels executing on the same processor is as long as possible. Once assigned to a processor 104, the newly identified speech sample's channel ID is stored in the time distribution table 216 along with the sample's time-stamp 208 and the processor that the sample was assigned to. The process of assigning samples to the various speech processors then repeats as new speech samples are received at the distribution mechanism 102.

Operation of processor selector unit 222 and the manner in which speech samples are assigned to a processor by the distribution mechanism 102 are now presented in detail.

Figures 3A, 3B, 3C:
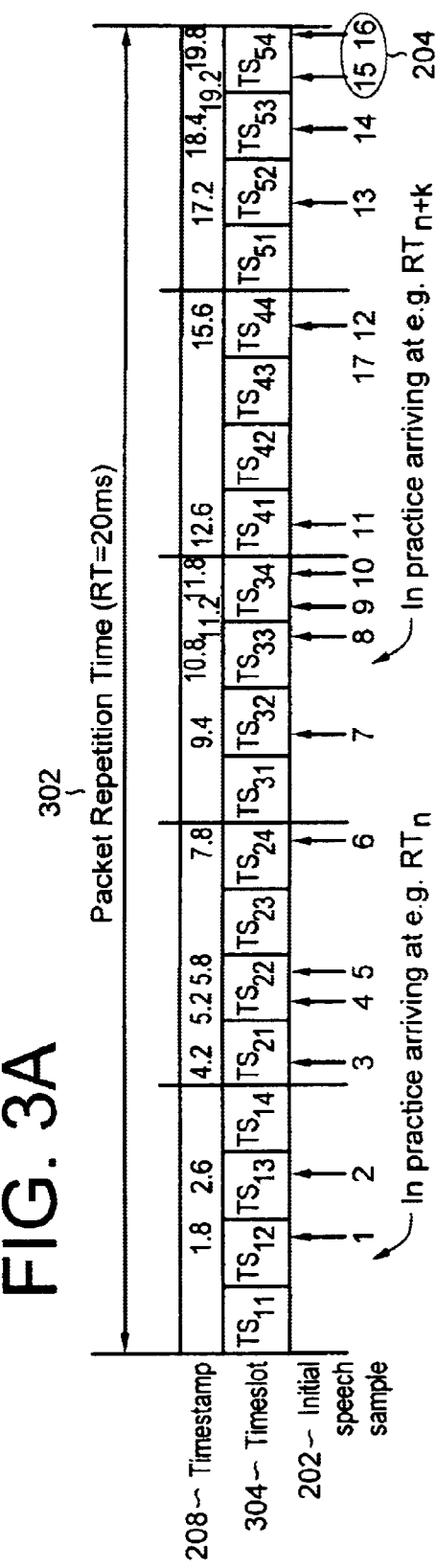
FIGS. 3A, 3B, and 3C illustrate the state of speech data in the distribution mechanism prior to allocating a new speech sample according to a first exemplary embodiment.

FIGS. 3A, 3B, and 3C illustrate an exemplary allocation of sixteen (16) speech channels in the distribution mechanism 102 prior to the arrival of a speech sample from a previously unassigned seventeenth speech channel. In an exemplary embodiment, the distribution mechanism 102 is configured to distribute speech samples requiring roughly the same processing capacity in each of the processors 104. An example of such a task requiring roughly equal processing capability across all speech samples may be the processing of an echo canceller algorithm in a PLMN.

The distribution process begins by first determining a packet repetition time (RT) 302 for the various speech channels in the telecommunication system. For example, in a Universal Mobile Telecommunication System (UMTS), the speech samples of a given call or channel are sent from a mobile station (not shown) every 20 ms. Therefore, for a processing unit 100 operating in a UMTS, the RT should be set to 20 ms.

The RT 302 may be divided into a plurality of time-slots 304 equal to the number of processors 104 available in the processing unit 100 multiplied-by the number of speech channels each processor 104 is capable of handling. In FIG. 3A, the processing unit 100 is shown to have four processors 104, each capable of processing the voice traffic from five different speech channels. Thus, in this illustration, the RT shown divided into 4*5=20 time-slots. The time-slots 304 may be labeled, e.g., $TS_{XY}$, where the sub-ordinal "X" represents the speech channel the time-slot is allocated to, and the sub-ordinal "Y" represents the processor the time-slot is allocated to.

Because the processing unit 100 is capable of servicing several speech channels simultaneously, it is possible for more than one speech sample arriving at the distribution mechanism 102 to be assigned to the same time-slot 304. This may occur either because the arrival times of the samples are identical, or because the arrival times are within the time-slot resolution. For example, FIG. 3A illustrates that the speech samples corresponding to channels 4 and 5, 9 and 10, and 15 and 16 have been assigned to the same time-slot, because the arrival times of each of these sample-pairs were within the time-slot resolution of 1 ms (20 ms÷20 time-slots=1 ms per time-slot resolution). When speech samples from different channels arrive at the distribution mechanism 102 near or within the same time-slot 304, it is desirable to assign the samples to different processors 104 in order to minimize the amount data queuing needed at each processor.

After determining an RT 302 for the various speech channels, a processing-slot distribution matrix 306 is created as shown in FIG. 3B. This matrix 306 represents the total processing capability of the processing unit 100 without queuing. The matrix has a number of processing-slots 308 equal to the number of time-slots 304 defined in the RT 302. The columns of the matrix 306 represent the various processors 104 available in the processing unit 100, e.g., 1 to 4, and the rows of the matrix represent the various processing-slots, e.g., 1 to 5, a variable in each processor. Like the associated time-slots, the processing-slots 308 may be labeled, e.g., $PS_{XY}$, where the sub-ordinal "Y" represents an available processor 104 in the processing unit 100, and the sub-ordinal "X" represents a processing-slot available on a respective processor.

It will be understood that the time distribution table 216, shown in FIG. 2, and the processing-slot distribution matrix 306, shown in FIG. 3B, may be implemented as the same entity, as the information contained in these entities is substantially the same. It may be advantageous, however, to organize the data stored in these entities in different formats so as to minimize the time required to search and retrieve information from the respective entities.

As described above, when speech samples arrive at the distribution mechanism 102, they are asynchronously received into the input buffer 206. The input buffer may operate as a First-In-First-Out (FIFO) register. Next, the speech samples are time-stamped according to a relative arrival time within the RT 302. The time-stamp 208 may be generated by a counter that is reset each time the counter reaches the RT 302 for the channel (20 ms in the example provided). FIG. 3 depicts the speech samples of sixteen speech channels, labeled 1 to 16, having been placed in the input buffer and time-stamped with the samples' various arrival times, e.g., 1.8 ms, 2.6 ms, etc., relative to the RT 302. An example of how the received samples may be mapped into the processing-slot distribution matrix 306 is shown in the example distribution matrix 310 depicted in FIG. 3C. The entries are made according to the processor and processing-slot that a corresponding channel speech sample has been assigned to by the processor selector unit 222, and comprise the channel ID 204 (i.e., 1 to 16) and time-stamp 208 (e.g., 1,8, 2.6, etc.) for the assigned speech samples.

Operation of the distribution mechanism 102 is further described with reference to FIGS. 4A, 4B, and 4C, which illustrate the allocation of speech samples within the distribution mechanism following the arrival of a new speech sample 402 from a previously unassigned channel 17. In addition to the arrival of new speech sample 402, the figures also illustrates the state of the distribution mechanism 102 following the completion of the speech processing for calls received on channels 6 and 7 of the system. The matrix entries $PS_{22}$ and $PS_{23}$, corresponding to the calls completed on channels 6 and 7 respectively, are removed from the processing-slot distribution matrix 306. Each of the blank entries in the distribution matrix 306 represent available processing resources within the processing unit 100. Thus, prior to the distribution of the new speech sample 402, the processing unit 100 has six processing-slots available for processing speech samples before having to queue any samples.

Distribution of the new speech sample 402 onto one of the processors 104 begins as described above in conjunction with FIG. 2. After being received into the input buffer 206, the sample 402 is assigned a relative time-stamp 208. The time-stamp assigned in the example is 14.8 ms. Following this, the header of the speech sample 402 is read to determine the sample's channel ID 204. In this example, the channel ID is determined to be 17. Next, the time distribution table 216 is searched to determine if the channel ID 17 has already been assigned to a processor 104. Having not yet been assigned to a processor, the channel ID and time-stamp of the sample 402 are forwarded to the processor selector unit 222 for processor selection.

Referring once again to FIG. 4, the processor selector unit 222 determines which unallocated position in the processing-slot distribution matrix 410 will result in the new sample's time-stamp being as far removed as possible from all other time-stamps of the samples being serviced by the respective processor. To make this determination, the processor selector unit 222 first uses the information stored in the processing-slot distribution matrix 410 to calculate the absolute value of the difference between at least one of a nearest time-stamp higher (if any) than the sample 402 time-stamp and a nearest time-stamp lower (if any) than the sample 402 time-stamp for each of the processors having available processing resources (or empty processing-slots).

Thus, referring to the example distribution matrix shown in FIG. 4C, the absolute value of the differences between 14.8 and: 11.2 and 17.2 (for processor 1), 11.8 and 18.4 (for processor 2), 12.6 and 19.2 (for processor 3), and 10.8 and 15.6 (for processor 4) are calculated. This yields the time-stamp difference-pairs 3.6 and 2.4 (for processor 1), 3.0 and 3.6 (for processor 2), 2.2 and 4.4 (for processor 3), and 4.0 and 0.8 (for processor 4) as shown in FIG. 5.

Next, the lowest value of each of the time-stamp difference-pairs are compared to one another to determine the highest minimum time-stamp difference among the available processors. In the example, the values compared are 2.4 (for processor 1), 3.0 (for processor 2), 2.2 (for processor 3), and 0.8 (for processor 4). The processor having the highest time-stamp difference among these compared values is selected to process the new sample 402. Selecting a processor in this manner maximizes the likelihood that the processing of speech samples for the channel that new sample 402 belongs to (i.e., channel 17) will be completed before samples for other channels arrive for processing. Thus, continuing with the example, processor 2 is selected to process the new sample 402, as this processor has the highest minimum time-stamp difference (i.e., 3.0) based on the new sample's relative time-stamp of 14.8 ms.

After having assigned a processor to the newly received sample 402, the distribution mechanism 102 sets up a connection from the newly assigned channel to the selected processor that will last for the duration of the call. Also, the assignment is recorded in the time distribution table 216 and processing-slot distribution matrix 410. After being processed by the selected processor 104, the speech samples for the assigned channel are forwarded to the output mechanism 106, where they are then dispatched in either a synchronous or asynchronous data stream. Processing of the next pending speech sample (if any) starts in a processor as soon as the previous processed sample is forwarded to the output mechanism 106. When all speech samples for a call have been processed, the call is terminated and the corresponding processor assignments in the processing-slot distribution matrix 410 and time distribution table 216 are freed.

Often times, the different channels of a telecommunication system will require varied processing capability. For example, certain channels may require CODEC processing, while other channels may require echo cancellation or perhaps tone-sending processing. Even channels requiring CODEC processing may require varied processing capability depending on the nature of the speech being processed. For example, CODECs often utilize a silence detection function that interrupts the speech coding process whenever silence is detected in a voice channel. When silence is detected in the voice channel, the CODEC dispatches special silence packets onto the channel rather than the packets of compressed speech data that are normally dispatched. These special silence packets are typically smaller in size than the normal compressed speech packets, and may also be dispatched at longer time intervals than the compressed speech packets. The resulting output from the CODEC is processed speech data having periods of a first bit-rate (corresponding to the dispatched compressed speech packets), interrupted occasionally by periods of a lower second bit-rate (corresponding to the dispatched special silence packets). The varying bit-rates in turn require a corresponding varying amount of processing resources.

The invention can be extended to account for situations when the different channels require varied processing capability by skewing the number and size of the processing-slots $PS_{XY}$ available in each of the processors 104 depending on the various processing tasks required in the channels. An exemplary embodiment in which variable processing capability can be achieved in the processing unit 100 is shown in FIGS. 6A, 6B, and 6C.

For example, FIG. 6C depicts an example distribution matrix 610 in which the number and size of processing-slots varies between processors. The size of the processing-slots correspond to a relative percentage of the respective available processor time. Thus, channels requiring additional processing resources, such as channels 11, 8, 17, and 3 in the example, can be assigned to larger processing-slots. Similarly, channels requiring less processing capability, such as channels 2 and 9 in the example, can be assigned to smaller processing-slots. Moreover, the size and number of processing-slots per processor may be dynamically allocated by the distribution mechanism 102 as the processing requirements in the system change. For example, as the processing demand for a specific speech channel changes over time, the size of the corresponding processing slot 308 must also change. Each of the processors 104 can report changes in the processing slots 308 to the distribution mechanism 102. The distribution mechanism 102 can then adjust the processing slot allocation in the distribution matrix 306 accordingly.

Aside from the skewing of the processing-slot distribution matrix 306, the steps performed in assigning speech samples to the processors of a processing unit having variable processing-slots are substantially the same as those steps for assigning speech samples to the processors of the processing unit having constant processing-slots described above. The only other change required in the allocation scheme is that the concept of "free" processing slots must be replaced with the concept of percentage of available processing capability, when determining which processors can be assigned new speech channels.

Finally, because it is likely that many of the speech channels in a telecommunication system will require processing tasks that utilize only a small percentage of a processor's overall capability, the number of rows in the processing-slot distribution matrix 610 can be higher than the number of rows in the corresponding processing-slot distribution matrix 410 for a constant processing-slot assignment scheme. As discussed above, speech is more robust than pure data in that a certain amount of speech samples can be dropped from the voice channel without significantly affecting the overall speech quality of the channel. Therefore, it is possible when using a variable processing-slot assignment scheme to "over-book" a processor, and thus occasionally throw-away speech samples to better utilize the processing unit's overall processing capacity. This increased processing efficiency can be accomplished without significantly compromising the overall speech quality in the system.

It will be understood to those skilled in the art that speech CODECs, echo cancellers, and the like are in practice located on a processor unit containing several individual processors of equal type. Each of these processors is typically capable of processing the speech data from several speech channels. Assuming a typical number of speech channels per processing unit to be 100, the typical call to or from a mobile station has a duration of about 90 seconds, and the processing unit is capable of handling 100 channels, the described distribution mechanism would have to be executed approximately once every second. Therefore, any additional processing load resulting from execution of the distribution mechanism is negligible.

The invention being thus described, it will be obvious that the same may be varied in many ways. Such variations are not to be regarded as a departure from the essence of the invention, which is defined by the following claims, and all modifications that fall within the scope of the following claims are intended to be included therein.

What is claimed is:

1. A method for processing asynchronous data comprising the steps of:
   receiving a plurality of asynchronous data samples from a plurality of data channels for distribution onto a plurality of data processors each having a plurality of processing-slots;
   identifying a channel from which a sample is received using a channel ID associated with the sample;
   time-stamping at least one sample from each respective channel with a time-stamp; and
   assigning the at least one time-stamped sample to a processing-slot such that the separation between the time-stamp and a nearest time-stamp of at least one sample assigned to at least one other processing-slot of each respective processor is maximized.

2. The method of claim 1, wherein the time-stamp corresponds to an arrival time of the at least one sample within a sample repetition time associated with the channels.

3. The method of claim 2, wherein the time-stamp is generated by a counter that is reset each time the counter reaches a value equal to the sample repetition time.

4. The method of claim 1, wherein the time-stamp corresponds to an average arrival time of a plurality of samples from each respective channel within a sample repetition time associated with the channels.

5. The method of claim 1, further comprising the step of assigning an un-stamped data sample to a same processing-slot assigned to at least one other sample received from the respective channel the un-stamped sample is received from.

6. The method of claim 5, wherein the at least one other sample is a first data sample received from the respective channel.

7. The method of claim 5, further comprising the step of creating an entry in a time distribution table for each assigned sample, the entry including the channel ID of the assigned sample, the time-stamp of the assigned sample, and a processing-slot ID corresponding to the processing-slot the sample is assigned to.

8. The method of claim 7, wherein the step of assigning an un-stamped data sample comprises the steps of:
   searching the time distribution table for a matching entry having the same channel ID as the un-stamped data sample; and
   assigning the un-stamped data sample to the processing-slot corresponding to the processing-slot ID of the matching entry.

9. The method of claim 7, further comprising the step of removing an entry from the time distribution table for an assigned sample when the processing of data samples for the channel corresponding to the channel ID of the assigned sample is complete.

10. The method of claim 1, further comprising the step of creating a processing-slot distribution matrix having a number of matrix entries equal to the number of processing-slots, wherein a column of the matrix corresponds to a respective processor and a row of the matrix corresponds to a respective processing-slot.

11. The method of claim 10, further comprising the step of storing the channel ID and time-stamp for each assigned sample in a matrix entry corresponding to the processor and processing-slot to which each sample is assigned.

12. The method of claim 11, wherein in the step of assigning the at least one time-stamped sample to a processing-slot, the maximum separation between the time-stamp of a sample to be assigned a processing-slot and the nearest time-stamp is determined by comparing time-stamp entries in the processing slot distribution matrix.

13. The method of claim 11, further comprising the step of removing the channel ID and time-stamp for an assigned sample from the distribution matrix when the processing of data samples for the channel corresponding to the channel ID of the assigned sample is complete.

14. The method of claim 11, wherein each matrix entry represents an equal amount of processor resource.

15. The method of claim 11, wherein each matrix entry represents a variable and dynamically allocable amount of processor resource.

16. The method of claim 15, wherein the amount of processor resource allocated to each matrix entry is dependent upon a processing task to be performed on the samples assigned to a respective processing-slot.

17. The method of claim 1, wherein in the time-stamping step, all of the received samples are time-stamped.

18. The method of claim 1, further comprising the step of distributing the samples to the processors for data processing based on the processing-slot assignments.

19. The method of claim 18, further comprising the step of dispatching the processed data samples into a telecommunication system in one of an asynchronous and a synchronous data stream.

20. The method of claim 1, further comprising the step of storing the data samples in an input buffer upon receipt.

21. The method of claim 1, wherein the data samples are processed using at least one of a code/decode (CODEC) algorithm, echo cancellation, tone sending and receiving, Dual-Tone-Multi-Frequency (DTMF) sending and receiving, video coding and decoding, ATM, IP, Frame Relay, FDMA, TDMA, and CDMA.

22. The method of claim 1, wherein at least one of the assigned samples is discarded by the respective processor.

23. An apparatus for processing asynchronous data comprising:
    means for receiving a plurality of asynchronous data samples from a plurality of data channels for distribution onto a plurality of data processors each having a plurality of processing-slots;
    means for identifying a channel from which a sample is received using a channel ID associated with the sample;
    means for time-stamping at least one sample from each respective channel with a time-stamp; and
    means for assigning the at least one time-stamped sample to a processing-slot such that the separation between the time-stamp and a nearest time-stamp of at least one sample assigned to at least one other processing-slot of each respective processor is maximized.

24. The apparatus of claim 23, wherein the time-stamp corresponds to an arrival time of the at least one sample within a sample repetition time associated with the channels.

25. The apparatus of claim 24, wherein the time-stamp is generated by a counter that is reset each time the counter reaches a value equal to the sample repetition time.

26. The apparatus of claim 23, wherein the time-stamp corresponds to an average arrival time of a plurality of samples from each respective channel within a sample repetition time associated with the channels.

27. The apparatus of claim 23, further comprising means for assigning an un-stamped data sample to a same processing-slot assigned to at least one other sample received from the respective channel the un-stamped sample is received from.

28. The apparatus of claim 27, wherein the at least one other sample is a first data sample received from the respective channel.

29. The apparatus of claim 27, further comprising means for creating an entry in a time distribution table for each assigned sample, the entry including the channel ID of the assigned sample, the time-stamp of the assigned sample, and a processing-slot ID corresponding to the processing-slot the sample is assigned to.

30. The apparatus of claim 29, wherein means for assigning an un-stamped data sample comprises:
    means for searching the time distribution table for a matching entry having the same channel ID as the un-stamped data sample; and
    means for assigning the un-stamped data sample to the processing-slot corresponding to the processing-slot ID of the matching entry.

31. The apparatus of claim 29, further comprising means for removing an entry from the time distribution table for an assigned sample when the processing of data samples for the channel corresponding to the channel ID of the assigned sample is complete.

32. The apparatus of claim 23, further comprising means for creating a processing-slot distribution matrix having a number of matrix entries equal to the number of processing-slots, wherein a column of the matrix corresponds to a respective processor and a row of the matrix corresponds to a respective processing-slot.

33. The apparatus of claim 32, further comprising means for storing the channel ID and time-stamp for each assigned sample in a matrix entry corresponding to the processor and processing-slot to which each sample is assigned.

34. The apparatus of claim 33, wherein the means for assigning the at least one time-stamped sample to a processing-slot maximizes the separation between the time-stamp of a sample to be assigned a processing-slot and the nearest time-stamp by comparing time-stamp entries in the processing slot distribution matrix.

35. The apparatus of claim 33, further comprising means for removing the channel ID and time-stamp for an assigned sample from the distribution matrix when the processing of data samples for the channel corresponding to the channel ID of the assigned sample is complete.

36. The apparatus of claim 33, wherein each matrix entry represents an equal amount of processor resource.

37. The apparatus of claim 33, wherein each matrix entry represents a variable and dynamically allocable amount of processor resource.

38. The apparatus of claim 37, wherein the amount of processor resource allocated to each matrix entry is dependent upon a processing task to be performed on the samples assigned to a respective processing-slot.

39. The apparatus of claim 23, wherein the means for time-stamping time-stamps all of the received samples.

40. The apparatus of claim 23, further comprising means for storing the data samples in an input buffer upon receipt.

41. The apparatus of claim 23, wherein the data samples are processed using at least one of a code/decode (CODEC) algorithm, echo cancellation, tone sending and receiving, Dual-Tone-Multi-Frequency (DTMF) sending and receiving, video coding and decoding, ATM, IP, Frame Relay, FDMA, TDMA, and CDMA.

42. The apparatus of claim 23, wherein at least one of the assigned samples is discarded by the respective processor.

43. The apparatus of claim 23, wherein the processors exist in a multiprocessor unit.

44. A system for processing asynchronous data comprising:
- a plurality of data processors each having a plurality of processing-slots, the processing-slots corresponding to an amount of processor resource in each of the data processors;
- a plurality of data channels each carrying a plurality of asynchronous data samples;
- a distribution mechanism including
  - means for receiving the data samples;
  - means for identifying a channel from which a sample is received using a channel ID associated with the sample;
  - means for time-stamping at least one sample from each respective channel with a time-stamp;
  - means for assigning the at least one time-stamped sample to a processing-slot such that the separation between the time-stamp and a nearest time-stamp of at least one sample assigned to at least one other processing-slot of each respective processor is maximized;
  - means for distributing the samples to the processors for data processing based on the processing-slot assignments; and
- an output mechanism coupled to the distribution mechanism for dispatching the processed data samples into a telecommunication system in one of an asynchronous and a synchronous data stream.

45. The system of claim 44, wherein the processors exist in a multi-processor unit.

46. The system of claim 45, wherein the distribution mechanism includes a plurality of multi-processor units.

* * * * *